United States Patent
Kim et al.

(10) Patent No.: US 11,470,177 B2
(45) Date of Patent: Oct. 11, 2022

(54) METHOD FOR PROCESSING DATA BY EDGE NODE IN NETWORK INCLUDING PLURALITY OF TERMINALS AND EDGE NODE

(71) Applicant: FOUNDATION OF SOONGSIL UNIVERSITY-INDUSTRY COOPERATION, Seoul (KR)

(72) Inventors: Young Han Kim, Seoul (KR); Ngoc Thanh Dinh, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 286 days.

(21) Appl. No.: 16/798,972

(22) Filed: Feb. 24, 2020

(65) Prior Publication Data
US 2021/0120095 A1 Apr. 22, 2021

(30) Foreign Application Priority Data
Oct. 17, 2019 (KR) .................... 10-2019-0129408

(51) Int. Cl.
*H04L 67/568* (2022.01)
*G06F 12/0802* (2016.01)

(52) U.S. Cl.
CPC ........ *H04L 67/568* (2022.05); *G06F 12/0802* (2013.01); *G06F 2212/60* (2013.01)

(58) Field of Classification Search
CPC ............. H04L 67/2842; G06F 12/0802; G06F 2212/60
See application file for complete search history.

(56) References Cited

U.S. PATENT DOCUMENTS

| | | | |
|---|---|---|---|
| 9,298,455 B1* | 3/2016 | Kolam | G06F 8/71 |
| 2011/0231490 A1* | 9/2011 | Inoue | H04L 67/1095 |
| | | | 709/204 |
| 2012/0047156 A1* | 2/2012 | Jarvinen | H04H 60/37 |
| | | | 707/758 |
| 2017/0026345 A1* | 1/2017 | Salek | H04W 12/033 |
| 2017/0195447 A1* | 7/2017 | Panagos | H04L 67/2814 |
| 2018/0146058 A1* | 5/2018 | Somayazulu | G06F 16/23 |

(Continued)

OTHER PUBLICATIONS

Dinh, Ngoc-Thanh, et al. "Potential of Information-Centric Wireless Sensor and Actor Networking" *School of Electronic Engineering, Soongsil University.* IEEE, 2013 (6 pages in English).

(Continued)

*Primary Examiner* — Viet D Vu
(74) *Attorney, Agent, or Firm* — NSIP Law

(57) ABSTRACT

The present disclosure provides a method for processing data by an edge node including: receiving a data request from an application; confirming whether first data corresponding to the data request is included in a content storage of the edge node; confirming whether there is second data having a correlation with the first data which is equal to or higher than a predetermined threshold value based on a previously stored mapping table when the first data is not included in the content storage of the edge node; and transmitting the second data to the application when there is the second data having the correlation with the first data which is equal to or higher than the threshold value.

10 Claims, 3 Drawing Sheets

(56) References Cited

U.S. PATENT DOCUMENTS

2019/0340274 A1* 11/2019 Keller ................. G06F 16/2282
2020/0021669 A1* 1/2020 Bikumala ............. H04L 69/321

OTHER PUBLICATIONS

Korean Notice of Allowance dated Jun. 28, 2021 in Counterpart Korean Patent Application No. 10-2019-0129408 (2 pages in Korean).
Dinh, Thanh, et al. "Information centric sensor-cloud integration: an efficient model to improve wireless sensor networks' lifetime." 2017 IEEE International Conference on Communications (ICC). IEEE, 2017 (6 pages in English).
Korean Office Action dated Oct. 15, 2020 in counterpart Korean Patent Application No. 10-2019-0129408 (5 pages in Korean).

* cited by examiner

[FIG. 1]
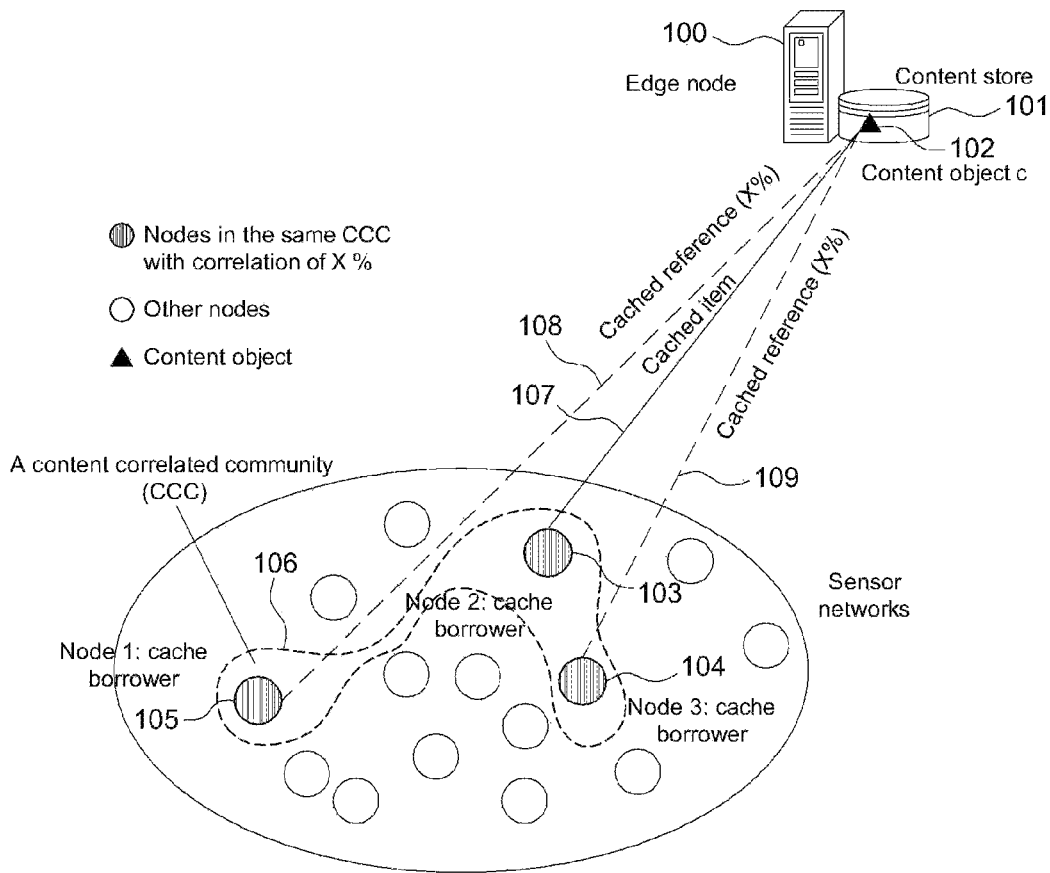
[FIG. 2]
| Prefix | CCC Lists | Correlation | Cache pointer |
|---|---|---|---|
| Temp | L1 (ID1, ID2, ID5) | 97% | ID1* |
| Temp | L2 (ID1, ID2, ID5 ID11, ID17) | 94% | ID6* |
| Temp | L3 (ID3, ID4, ID9) | 94% | ID4* |
| Temp | L1 (ID1, ..., ID13, ID14) | 91% | ID4* |
| Temp | L2 (ID3, ..., ID10) | 91% | NULL |
| Temp | L3 (ID6, ID7, ID15) | 91% | ID6* |

[FIG. 3]
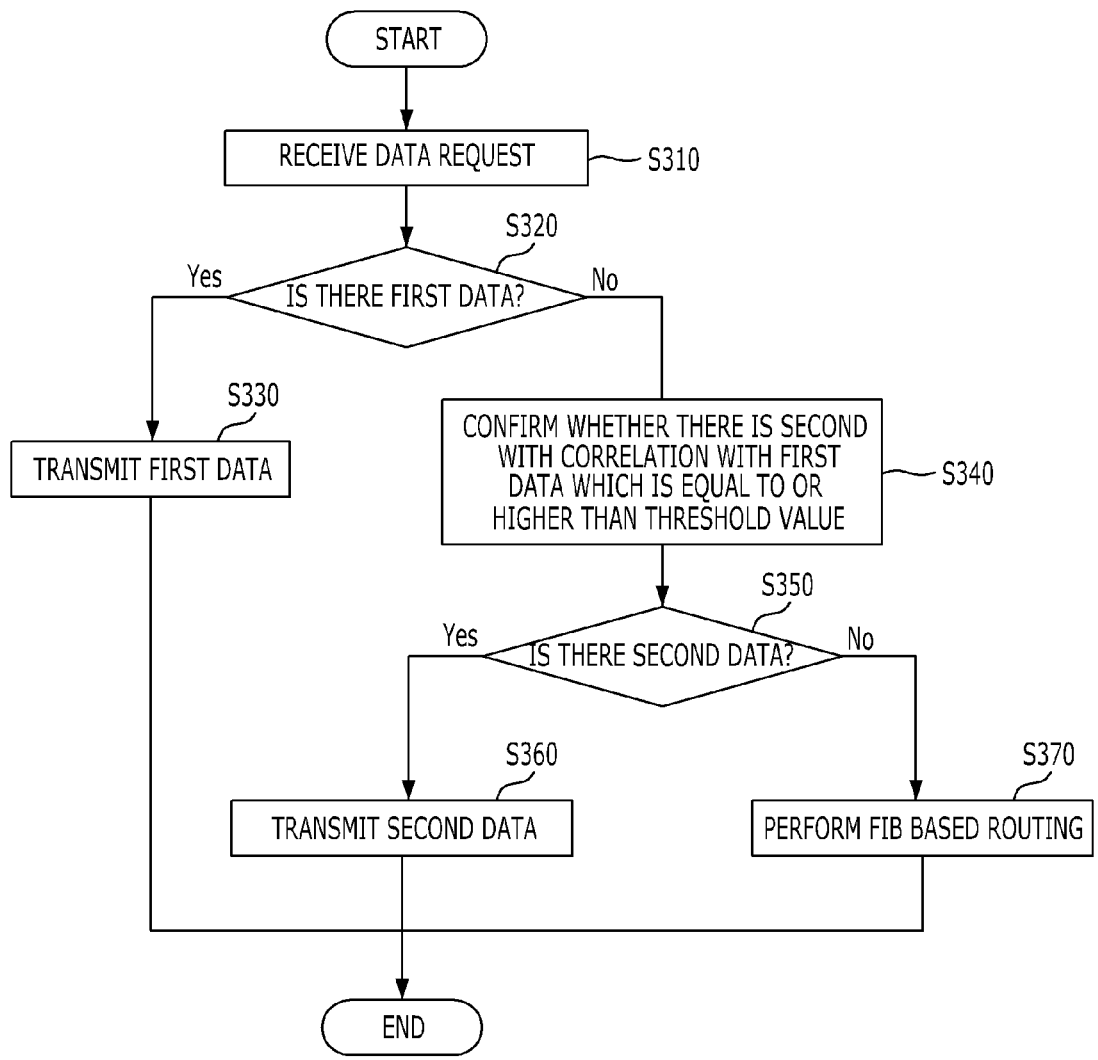

[FIG. 4]
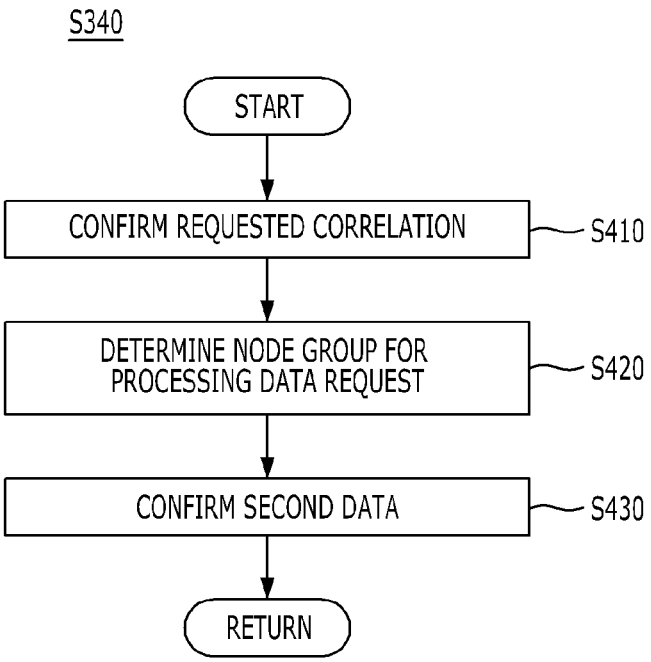
[FIG. 5]
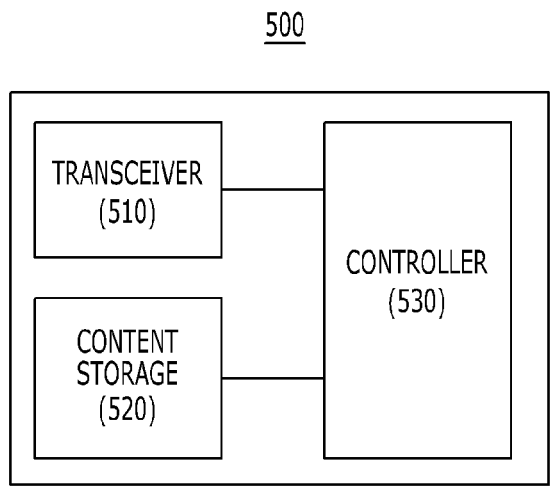

METHOD FOR PROCESSING DATA BY EDGE NODE IN NETWORK INCLUDING PLURALITY OF TERMINALS AND EDGE NODE

CROSS-REFERENCE TO RELATED APPLICATIONS

This application claims the priority of Korean Patent Application No. 10-2019-0129408 filed on Oct. 17, 2019, in the Korean Intellectual Property Office, the disclosure of which is incorporated herein by reference.

BACKGROUND

Field

The present disclosure relates to a method for processing data by an edge node in a network including a plurality of terminals and the edge node.

Description of the Related Art

A content delivery network (CDN) service is a service which stably delivers various contents including motion images such as movies or music videos to a user. Generally, the content delivery network service is implemented such that contents are stored in advance in a plurality of cache servers distributed on a network, an optimal cache server is selected from the plurality of cache servers to deliver requested contents to a terminal of a user through the selected cache server.

Such a content delivery network is implemented based on an Internet network to solve instability such as data loss, a bottle neck phenomenon, slow transmission speed, data interruption on the Internet. In the meantime, recently, as mobile terminals such as smart phones have high performance and high functionality and communication costs become cheaper, the usage of contents through mobile terminals is rapidly increasing. Therefore, attempts have been made to integrate a server of a content delivery network into a mobile network.

In the meantime, the Internet is evolving from a human-centered connection network where humans create and consume information to an Internet of Things (IoT) network which transmits and receives information between distributed components such as things. The Internet of Everything (IoE) technology in which big data processing technology is combined with the IoT technology through the connection with a cloud server is also emerging. In order to implement the IoT, technology elements such as a sensing technology, a wired/wireless communication and network infrastructure, a service interface technology, and a security technology are required so that recently, the technology for connection between things such as a sensor network, a machine to machine (M2M), and a machine type communication (MTC) is being studied.

Under the IoT environment, an intelligent internet technology (IT) service which creates a new value for a human life by collecting and analyzing data generated from the connected things may be provided. The IoT may be applied to fields of smart homes, smart buildings, smart cities, smart cars or connected cars, smart grids, a health care, smart home appliances, and advanced medical services through convergence and combination between the existing information technology (IT) and various industries.

SUMMARY

Under the IoT environment, the number of terminals which perform the same operations in a specific region may be increased and thus the redundancy of the IoT terminal which performs the same operation in a specific region may be significantly increased. Therefore, an object of the present disclosure is to provide a method for efficiently processing data in such a complex IoT environment.

Technical objects of the present disclosure are not limited to the aforementioned technical objects and other technical objects which are not mentioned will be apparently appreciated by those skilled in the art from the following description.

According to an aspect of the present disclosure, a method for processing data by an edge node includes receiving a data request from an application; confirming whether first data corresponding to the data request is included in a content storage of the edge node; confirming whether there is second data having a correlation with the first data which is equal to or higher than a predetermined threshold value based on a previously stored mapping table when the first data is not included in the content storage of the edge node; and transmitting the second data to the application when there is the second data having the correlation with the first data which is equal to or higher than the threshold value.

According to an exemplary embodiment, the mapping table includes information about a node group including at least one node, information about a correlation between nodes which configure each node group, and information about data corresponding to each node group and each node which configures the mapping table is distinguished by an identifier allocated to each node.

According to an exemplary embodiment, the identifier may include information about a time when data corresponding to each node is acquired and the mapping table may be updated in accordance with a predetermined cycle or a triggering condition.

According to an exemplary embodiment, the node group includes a plurality of nodes having a correlation between data collected from each node which is equal to or higher than a predetermined reference value.

According to an exemplary embodiment, the plurality of nodes includes at least one of a temperature sensor which senses a temperature, an illuminance sensor which senses a brightness, or a humidity sensor which senses a humidity.

According to an exemplary embodiment, the confirming of whether there is second data includes: confirming a requested correlation from the data request; determining a node group for processing the data request based on information about the requested correlation and the correlation between the nodes; and confirming the second data represented by information about data corresponding to the determined node group.

According to an exemplary embodiment, the method for processing data by the edge node may further include transmitting the first data stored in the content storage to the application when the first data is included in the content storage; and performing forwarding information base (FIB)-based routing with the plurality of nodes when there is no second data having the correlation with the first data which is equal to or higher than the threshold value.

According to another aspect of the present disclosure, an edge node includes a transceiver which transmits and receives data; a content storage which caches the data; and a controller which controls the transceiver to receive a data request from an application, confirm whether first data corresponding to the data request is included in the content storage, confirm whether there is second data having a correlation with the first data which is equal to or higher than the predetermined threshold value based on a previously stored mapping table when the first data is not included in the content storage, and transmit the second data to the application when there is second data having a correlation with the first data which is equal to or higher than the predetermined threshold value.

According to an exemplary embodiment, the mapping table includes information about a node group including at least one node, information about a correlation between nodes which configure each node group, and information about data corresponding to each node group and each node which configures the mapping table is distinguished by an identifier allocated to each node.

According to an exemplary embodiment, the identifier may include information about a time when data corresponding to each node is acquired and the mapping table may be updated in accordance with a predetermined cycle or a triggering condition.

According to an exemplary embodiment, the node group may include a plurality of nodes having a correlation between data collected from each node which is equal to or higher than a predetermined reference value.

According to an exemplary embodiment, the plurality of nodes may include at least one of a temperature sensor which senses a temperature, an illuminance sensor which senses a brightness, or a humidity sensor which senses a humidity.

According to an exemplary embodiment, the controller may confirm the requested correlation from the data request, determine a node group for processing the data request based on information about the requested correlation and the correlation between nodes, and confirm the second data represented by the information about data corresponding to the determined node group.

According to an exemplary embodiment, when the first data is included in the content storage, the controller may control the transceiver to transmit the first data stored in the content storage to the application and when there is no second data having a correlation with the first data which is equal to or higher than the threshold value, perform forwarding information base (FIB)-based routing with the plurality of nodes.

According to an embodiment of the present disclosure, content objects stored in a content storage may be recycled if necessary so that a data processing rate of the network may be improved.

Further, according to an embodiment of the present disclosure, only data with a correlation with data required by an application which is equal to or higher than a predetermined level is provided to the application so that a data processing accuracy may be improved.

The effects of the present disclosure are not limited to the technical effects mentioned above, and other effects which are not mentioned can be clearly understood by those skilled in the art from the following description

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a view illustrating a network architecture according to an exemplary embodiment of the present disclosure;

FIG. 2 is a view illustrating a mapping table according to an exemplary embodiment of the present disclosure;

FIG. 3 is a flowchart illustrating a data processing method by an edge node according to an exemplary embodiment of the present disclosure;

FIG. 4 is a flowchart illustrating a method for confirming the presence of second data of an edge node according to an exemplary embodiment of the present disclosure; and FIG. 5 is a block diagram illustrating an edge node according to an exemplary embodiment of the present disclosure.

DETAILED DESCRIPTION OF THE PREFERRED EMBODIMENT

Those skilled in the art may make various modifications to the present disclosure and the present disclosure may have various embodiments thereof, and thus specific embodiments will be described in detail with reference to the drawings. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar elements.

Terms such as first, second, A, or B may be used to describe various components, but the components are not limited by the above terms. The above terms are used only to discriminate one component from the other component. For example, without departing from the scope of the present disclosure, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment but are not intended to limit the present disclosure. A singular form may include a plural form if there is no clearly opposite meaning in the context. In the present disclosure, it should be understood that terminology "include" or "have" indicates that a feature, a number, a step, an operation, a component, a part or the combination thoseof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art and shall not be construed in ideal or excessively formal meanings unless they are clearly defined in the present application.

In the specification and the claim, unless explicitly described to the contrary, the word "comprise" and variations such as "comprises" or "comprising", will be understood to imply the inclusion of stated elements but not the exclusion of any other elements.

Hereinafter, exemplary embodiments according to the present disclosure will be described in detail with reference to accompanying drawings.

FIG. 1 is a view illustrating a network architecture according to an exemplary embodiment of the present disclosure.

According to an exemplary embodiment, a network may be configured by an information-centered sensor network and an edge node 100 including a content storage 101. According to various exemplary embodiments, the edge node 100 may be a node located at an edge of the sensor network and a data request or contents of an application or an application program may be delivered to the edge node 100.

According to an exemplary embodiment, the content storage 101 may store a content object 102. According to various exemplary embodiments, the content object 102 may include a plurality of chunks. For example, the plurality of content objects may be stored in the content storage 101 with respect to names and may be searched using the stored names.

According to an exemplary embodiment, the sensor network may include a plurality of nodes. According to various exemplary embodiments, the node may be a terminal including a sensing function. For example, the node may be configured by one of a temperature sensor which senses a temperature, a humidity sensor which senses a humidity, and an illuminance sensor which senses illuminance.

According to an exemplary embodiment, some of nodes which configure the sensor network may be configured by one node group 105 (a content correlated community). According to various exemplary embodiments, the node group 105 may be configured by nodes having a content correlation which is equal to or higher than a predetermined reference value, among nodes which configure the sensor network. For example, the sensor network includes 10 nodes. When three nodes of nine nodes are nodes related to the temperature sensor, four nodes are nodes related to the humidity sensor, and two nodes are nodes related to the illuminance sensor, three nodes related to the temperature sensor may be determined as a temperature node group, four nodes related to the humidity sensor may be determined as a humidity node group, and two nodes related to the illuminance sensor may be determined as an illuminance node group.

According to an exemplary embodiment, a cache contributor 103 may be a producer of the content object 102 stored in the content storage 101. For example, when the cache contributor 103 is a temperature sensor, temperature information which is provided by the cache contributor 103 to the content storage 101 may be the content object 102 stored in the content storage 101.

According to an exemplary embodiment, cache borrowers 104 and 105 may be nodes having higher correlation with the cache contributor 103. According to various exemplary embodiments, the edge node 100 may use the content object provided by the cache contributor 103 to provide an application request appropriate for the cache borrowers 104 and 105.

According to an exemplary embodiment, when the corresponding node is a producer of the corresponding content (that is, the corresponding node is a cache contributor), the content object 102 stored in the content storage 101 of the edge node 100 may be a cache item 107 of the node. According to various exemplary embodiments, the cache item 107 is produced by the cache contributor 103 so that a data accuracy of the cache item 107 for the content request for the cache contributor 103 may be considered as 100%. That is, all content requests may be provided to the cache contributor 103 using the cache item 107.

According to one exemplary embodiment, when the nodes are cache borrowers 104 and 105, the content object 102 stored in the content storage 101 may be referred to as a cached reference of the node. According to various exemplary embodiments, when a correlation of the cached reference is equal to or higher than a predetermined level and a data accuracy correlation requested from the application is equal to or lower than the level, the cached reference may be used to provide contents requested by the cache borrowers 104 and 105. In the meantime, the correlation of the cached reference may be determined based on the content correlation between the cache contributor 103 and the cache borrowers 104 and 105.

FIG. 2 is a view illustrating a mapping table according to an exemplary embodiment of the present disclosure.

According to an exemplary embodiment, the edge node may store a mapping table illustrated in FIG. 2. According to various exemplary embodiments, the mapping table may include an item for a prefix, an item (CCC lists) for nodes which configure a node group, an item (correlation) for a correlation between nodes which configure a node group, and an item (cache pointer) for data corresponding to a node group.

According to one exemplary embodiment, an item for prefixes which configure a mapping table may be used to identify which information is indicated by nodes which configure a node group. For example, as illustrated in FIG. 2, when the prefix is configured with "temp", it is confirmed that the mapping table is about temperature information. According to various exemplary embodiments, when the node is associated with an illuminance sensor, the prefix may be configured with "ligh" and when the node is associated with a humidity sensor, the prefix may be configured with "humi". In the meantime, as it will be described below, the item for the prefix may be used to determine a name of each node.

According to one exemplary embodiment, items for nodes which configure the node group may include identifiers of nodes which configure one group. According to various exemplary embodiments, the node group may be distinguished based on a correlation between nodes which configure the node group. For example, when it is assumed that twenty nodes associated with the temperature are included in the sensor network and identifiers ID1 to ID20 are allocated to the respective nodes, a node group having a correlation of 97% or higher may be configured by three nodes with identifiers ID1, ID2, and ID5, as illustrated in FIG. 2. According to the same principle, a node group having a correlation of 94% or higher may be configured by a first node group including identifiers ID1, ID2, ID5, ID11, and ID17 and a second node group including identifiers ID3, ID4, and ID9, as illustrated in FIG. 2. Detailed description of a node group having a correlation of 91% or higher is the same as the above-described principle, so that the redundant description will be omitted.

According to one exemplary embodiment, the identifier of each node may be determined based on the above-mentioned prefix. For example, an identifier of a node associated with the temperature sensing may be configured by "temp::1325". In "temp::1325", "temp" represents that a node is associated with a temperature and "1325" may be numbers allocated to classify a plurality of nodes associated with a temperature.

According to one exemplary embodiment, an identifier allocated to each node may be used to identify a content object. In the above-described example, a content object cached by a node identified by "temp::1325" may be identified as "temp::1325". According to various exemplary embodiments, each node may consistently generate contents over time. For example, temperature data sensed by the temperature sensor may have different values over time. Therefore, in order to classify data which varies over time, an identifier to identify the content object may be configured as "temp::1325/p=0087". In the above identifier, "/p=0087" may be information for identifying a time when the content is generated. Therefore, the more recently generated content, the larger the number which configures the identifier.

In the meantime, an identifier allocating method disclosed in the present disclosure is merely an exemplary embodiment, so that the scope of the present disclosure is not limited to the identifier allocating method disclosed in the present disclosure.

According to one exemplary embodiment, an item for data corresponding to a node group which configures the mapping table may be used to provide data requested by an application. For example, when a requested correlation of the requested data is 95% or higher and an application requests a node corresponding to ID1 for data, the edge node may provide a content object identified by ID1* in the content storage to the application based on the mapping table illustrated in FIG. 2. According to various exemplary embodiments, a specific node group included in the mapping table may have a Null value as an item for data corresponding to the node group. In this case, the edge node may determine that there is no content object having a requested correlation with the requested data which is equal to or higher than a specific level and perform routing based on forwarding information base (FIB).

According to one exemplary embodiment, the mapping table may be arranged in the descending order of correlation. Since the higher the correlation, the higher the possibility of matching data requested by the application, the mapping table may be disposed in accordance with the correlation. In this case, the edge node may search for a node group corresponding to the data request requested in the disposed order in the mapping table to determine a node group having the highest correlation with the requested data.

According to one exemplary embodiment, the mapping table illustrated in FIG. 2 may be updated periodically or in accordance with a triggering condition. For example, the mapping table may be updated every day or when new data is collected from the node, the mapping table may be updated.

FIG. 3 is a flowchart illustrating a data processing method of an edge node according to an exemplary embodiment of the present disclosure. According to one exemplary embodiment, the flow chart illustrated in FIG. 3 may be performed by an edge node illustrated in FIG. 5.

According to one exemplary embodiment, in step S310, the edge node may receive a data request from an application. According to various exemplary embodiments, the data request may include information about a requested correlation. For example, when the application requests data about a temperature of a specific region from an edge node, the data request may include information associated with a data accuracy. That is, whether the application requests data with an accuracy of 95% or higher or data with an accuracy of 90% or higher may be included in the data request which is transmitted to the edge node by the application.

According to one exemplary embodiment, in step S320, the edge node may confirm whether first data corresponding to the data request is included in the content storage of the edge node. According to various exemplary embodiments, when the first data corresponding to the data request is included in the content storage of the edge node, in step S330, the edge node may transmit the first data stored in the content storage to the application.

According to one exemplary embodiment, when the first data is not included in the content storage of the edge node, in step S340, the edge node may confirm whether there is second data having a correlation with the first data which is equal to or higher than a predetermined threshold value, based on a previously stored mapping table. Step S340 will be described below in more detail with reference to FIG. 4. According to various exemplary embodiments, the mapping table used in step S340 may be configured as the same as the mapping table illustrated in FIG. 2.

According to one exemplary embodiment, in step S350, when it is determined that there is the second data having a correlation with the first data which is equal to or higher than the threshold value, in step S360, the edge node may transmit the second data to the application. According to various exemplary embodiments, in step S350, when it is determined that there is no second data having a correlation with the first data which is equal to or higher than the threshold value, in step S370, the edge node may perform forwarding information base (FIB) based routing by a plurality of nodes which performs communication with the edge node.

FIG. 4 is a flowchart illustrating a method for confirming the presence of second data of an edge node according to an exemplary embodiment of the present disclosure. According to one exemplary embodiment, the flow chart illustrated in FIG. 4 may be performed by an edge node illustrated in FIG. 5.

According to one exemplary embodiment, in step S410, the edge node may confirm the requested correlation from the data request received from the application. According to various exemplary embodiments, the data request may include the accuracy of the data requested by the application and the requested correlation may be determined based on the accuracy of the data. For example, when the application requests data with the accuracy of 95%, the requested correlation may be 95%.

According to the exemplary embodiment, in step S420, the edge node may determine a node group for processing the data request based on information about the requested correlation and the correlation between nodes included in the mapping table. For example, when the mapping table is as illustrated in FIG. 2 as described above and the requested correlation received from the application is 95%, the edge node may search for and determine a node group having a correlation of 95% or higher from the mapping table. That is, the edge node may determine a group L1 including nodes ID1, ID2, and ID5 as a node group for transmitting data.

According to one exemplary embodiment, in step S430, the edge node may confirm the second data represented by information about data corresponding to the determined node group. According to the above-described example, in step S420, the group L1 is determined so that the edge node may confirm the content object represented by ID1* mapped to the group L1.

FIG. 5 is a block diagram illustrating an edge node according to an exemplary embodiment of the present disclosure.

According to one exemplary embodiment, the edge node 500 may include a transceiver 510 which transmits and receives data, a content storage 520 which caches the data, and a controller 530 which controls the transceiver 510 to receive a data request from an application, confirm whether the first data corresponding to the data request is included in the content storage 520, confirm whether there is second data with a correlation with the first data which is equal to or higher than a predetermined threshold value based on the previously stored mapping table when the first data is not included in the content storage 520, and transmit the second data to the application when there is the second data having the correlation with the first data is equal to or higher than the threshold value.

According to one exemplary embodiment, the controller 530 may confirm the requested correlation from the data request, determine a node group for processing the data request based on information about the requested correlation and the correlation between nodes, and confirm the second data represented by the information about data corresponding to the determined node group. According to various exemplary embodiments, when the first data is included in the content storage 520, the controller 530 may control the transceiver 510 to transmit the first data stored in the content storage 520 to the application and when there is no second data having the correlation with the first data which is equal to or higher than the threshold value, perform the FIB-based routing with the plurality of nodes.

It will be appreciated that various exemplary embodiments of the present disclosure have been described herein for purposes of illustration, and that various modifications, and changes may be made by those skilled in the art without departing from the scope and spirit of the present disclosure. Therefore, the exemplary embodiments of the present disclosure are provided for illustrative purposes only but not intended to limit the technical concept of the present disclosure. The scope of the technical concept of the present disclosure is not limited thereto. The protection scope of the present disclosure should be interpreted based on the following appended claims and it should be appreciated that all technical spirits included within a range equivalent thereto are included in the protection scope of the present disclosure.

What is claimed is:

1. A method for processing data by an edge node which caches data from a plurality of nodes, the method comprising:
   receiving a data request from an application;
   confirming whether first data corresponding to the data request is included in a content storage of the edge node;
   confirming a previously stored mapping table when the first data is not included in the content storage of the edge node,
   wherein the mapping table includes information about a node group including at least one node, information about a correlation between nodes which configure each node group, and information about data corresponding to each node group and each node which configures the mapping table is distinguished by an identifier allocated to each node,
   confirming whether there is second data having information about a correlation with the first data which is equal to or higher than a predetermined threshold value based on the mapping table,
   wherein the confirming of whether there is second data includes confirming a requested correlation from the data request, determining a node group for processing the data request based on information about the requested correlation and the correlation between the nodes and confirming the second data represented by information about data corresponding to the determined node group; and
   transmitting the second data to the application when there is the second data having the correlation with the first data which is equal to or higher than the threshold value.

2. The method for processing data by an edge node according to claim 1, wherein the identifier includes information about a time when data corresponding to the node is acquired and the mapping table is updated in accordance with a predetermined cycle or a triggering condition.

3. The method for processing data by an edge node according to claim 1, wherein the node group includes a plurality of nodes having a correlation between data collected from each node which is equal to or higher than a predetermined reference value.

4. The method for processing data by an edge node according to claim 3, wherein the plurality of nodes includes at least one of a temperature sensor which senses a temperature, an illuminance sensor which senses a brightness, and a humidity sensor which senses a humidity.

5. The method for processing data by an edge node according to claim 1, further comprising:
   transmitting the first data stored in the content storage to the application when the first data is included in the content storage; and
   performing forwarding information base (FIB) based routing with the plurality of nodes when there is no second data having the correlation with the first data which is equal to or higher than the threshold value.

6. An edge node which caches data from a plurality of nodes, the edge node comprising:
   a transceiver which transmits and receives data;
   a content storage which caches the data; and
   a controller which controls the transceiver to receive a data request from an application, confirm whether first data corresponding to the data request is included in the content storage, confirm a previously stored mapping table when the first data is not included in the content storage of the edge node, wherein the mapping table includes information about a node group including at least one node, information about a correlation between nodes which configure each node group, and information about data corresponding to each node group and each node which configures the mapping table is distinguished by an identifier allocated to each node, confirm whether there is second data having information about a correlation with the first data which is equal to or higher than a predetermined threshold value based on the mapping table, and transmit the second data to the application when there is the second data having a correlation with the first data which is equal to or higher than the threshold value,
   wherein the controller confirms a requested correlation from the data request, determines a node group for processing the data request based on information about the requested correlation and the correlation between the nodes, and confirms the second data represented by the information about data corresponding to the determined node group.

7. The edge node according to claim 6, wherein the identifier includes information about a time when data corresponding to the node is acquired and the mapping table is updated in accordance with a predetermined cycle or a triggering condition.

8. The edge node according to claim 6, wherein the node group includes a plurality of nodes having a correlation between data collected from each node which is equal to or higher than a predetermined reference value.

9. The edge node according to claim 8, wherein the plurality of nodes includes at least one of a temperature sensor which senses a temperature, an illuminance sensor which senses a brightness, or a humidity sensor which senses a humidity.

10. The edge node according to claim 6, wherein when the first data is included in the content storage, the controller controls the transceiver to transmit the first data stored in the content storage to the application and when there is no second data having a correlation with the first data which is equal to or higher than the threshold value, performs forwarding information base (FIB) based routing with the plurality of nodes.

* * * * *